A. A. Wilder,

Clapboard Machine,

No. 840, Reissued Oct. 18, 1859.

AM. PHOTO-LITHO. CO. N.Y. (OSBORNE'S PROCESS)

UNITED STATES PATENT OFFICE.

ARETUS A. WILDER, OF DETROIT, MICHIGAN.

IMPROVED CLAPBOARD-MACHINE.

Specification forming part of Letters Patent No. 13,734, dated October 30 1855; Reissue No. 840, dated October 18, 1859.

*To all whom it may concern:*

Be it known that I, ARETUS A. WILDER, of the city of Detroit, county of Wayne, and State of Michigan, have invented an Improvement in Sawing Clapboards; and I do hereby declare that the following is a full, clear, and exact description of the principle or character which distinguishes it from all other things before known and of the usual manner of making and using the same, reference being had to the annexed drawings.

Figure 3:
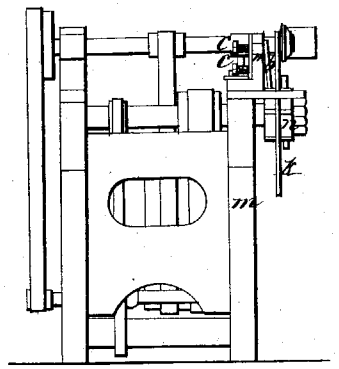
Figure 4:
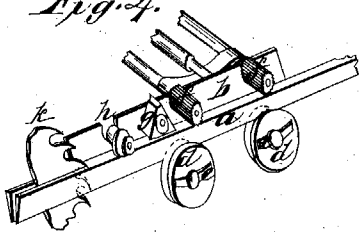
Figure 1:
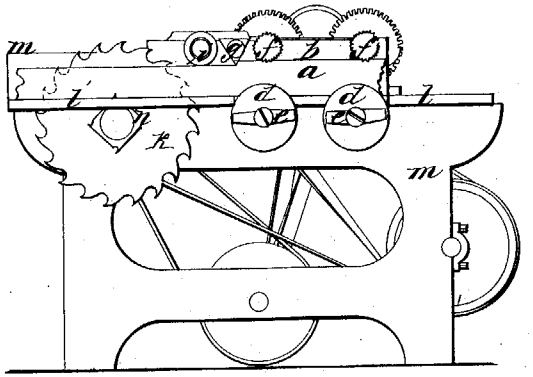
Figure 2:
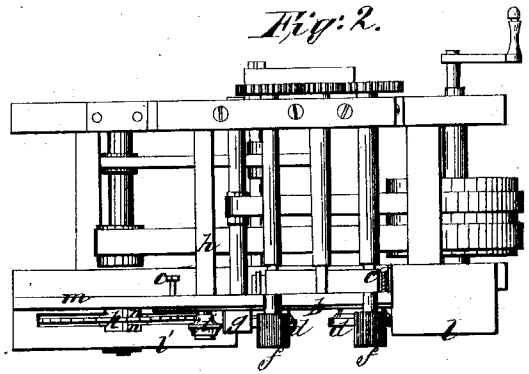

Figure 1 is a side elevation; Fig. 2, a top view or plan; Fig. 3, an end view; Fig. 4, a detached part of the machine in perspective.

My invention consists in resawing and bringing planks or boards to an equal width at the same time. The machine is hereinafter described.

The saw K is arranged with its plane of motion parallel to the vertical side *m* of the frame of the machine, and at a distance from the said side of the frame equal to about one half the usual thickness of the plank to be operated upon. Close to the side *m*, and extending in rear of the saw, cutters, flanges, and feed-rollers, there is an adjustable back rest. It consists of a plate, *b*, which can be set at various angles with the vertical side *m* of the frame by means of the set-screws *c c*. The plank during the time it is operated upon by the saw and cutters is slid along the back rest by means of feed-rollers *f f*, and it is pressed close to the back rest by means of the flange-rollers *d d* at the lower edge of the plank, and by one flange-roller *i* at the upper edge of the plank. The flange-roller *i* is arranged on a shaft, *h*, between the cutter-head *g* and saw K. The flange-rollers *d d* are placed below and in vertical lines with the feed-rollers *f f*. They are loose in the shafts, and are pressed against the back rest, *b*, by means of springs *e e*, which are fastened to the outer ends of said shafts.

The plank thus confined to the back rset passes first under the cutter *g*, which planes its upper edge, and then it is operated upon by the saw. As the saw uniformly cuts in a vertical plane, whereas the plank has a certain inclination equal to the inclination given to the back rest, *b*, the outer sides of the plank will be oblique to the cut performed by the saw, and, as the inclination of the back rest is adjustable, as above described, clapboards of any desired taper can be produced by this machine.

The lower edge of the plank is planed by means of cutters *n*, arranged in the center of the saw K. The lower edge of the plank during the operation of the saw and after leaving the flange-rollers *d d* passes over the horizontal table *l'*.

What I claim as my improvement is—

1. Resawing and bringing plank to an equal width at the same time.

2. The flange-rollers, with their springs or equivalents, in combination with the adjustable back rest, for the purposes hereinbefore described.

ARETUS A. WILDER.

Witnesses:

GEO. B. ENSWORTH,

CYRUS JENKS.